D. A. LINDHOLM.
ATTACHMENT FOR MOWING MACHINES.
APPLICATION FILED SEPT. 6, 1912.

1,134,339.

Patented Apr. 6, 1915.
4 SHEETS—SHEET 1.

Witnesses:
Robert H. Weir
Arthur B. Franke

Inventor:
D. A. Lindholm
H. Sandler
Atty.

D. A. LINDHOLM.
ATTACHMENT FOR MOWING MACHINES.
APPLICATION FILED SEPT. 6, 1912.

1,134,339.

Patented Apr. 6, 1915.
4 SHEETS—SHEET 3.

Witnesses:
Robert H. Weir
Arthur B. Franke

Inventor:
D. A. Lindholm
H. Sanders
Atty.

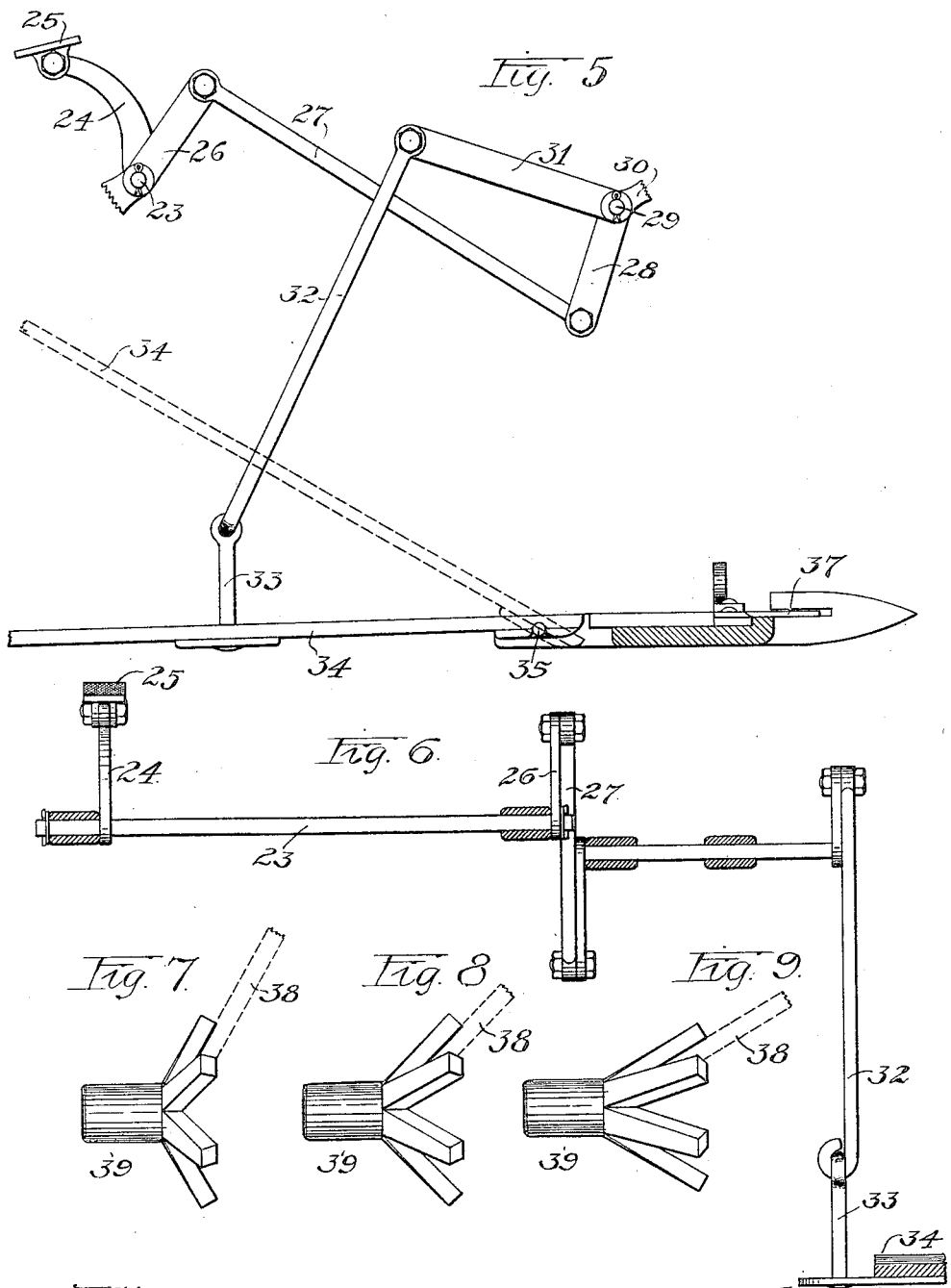

UNITED STATES PATENT OFFICE.

DANEL A. LINDHOLM, OF BELFIELD, NORTH DAKOTA.

ATTACHMENT FOR MOWING-MACHINES.

1,134,339.  Specification of Letters Patent.  Patented Apr. 6, 1915.

Application filed September 6, 1912. Serial No. 718,923.

*To all whom it may concern:*

Be it known that I, DANEL A. LINDHOLM, a citizen of Sweden, residing at Belfield, in the county of Stark, in the State of North Dakota, have invented certain new and useful Improvements in Attachments for Mowing-Machines, of which the following is a specification.

This invention relates to improvements in attachments for mowing machines and more particularly to a clover buncher and its construction involves a reel carried by the mower which is adapted to force the standing clover back upon a pivoted bed, just before the cutting operation, which bed is controlled by foot power mechanism and thereby raised into receptive position and when a load or bunch is cut the bed may be depressed and the load, through contact with the field stubble, deposited in wind rows.

The invention consists in the combination and arrangement of parts to be hereinafter fully described in the following specification, pointed out in the claim and illustrated in the accompanying drawings which form a part of the specification and in which—

Figure 1:
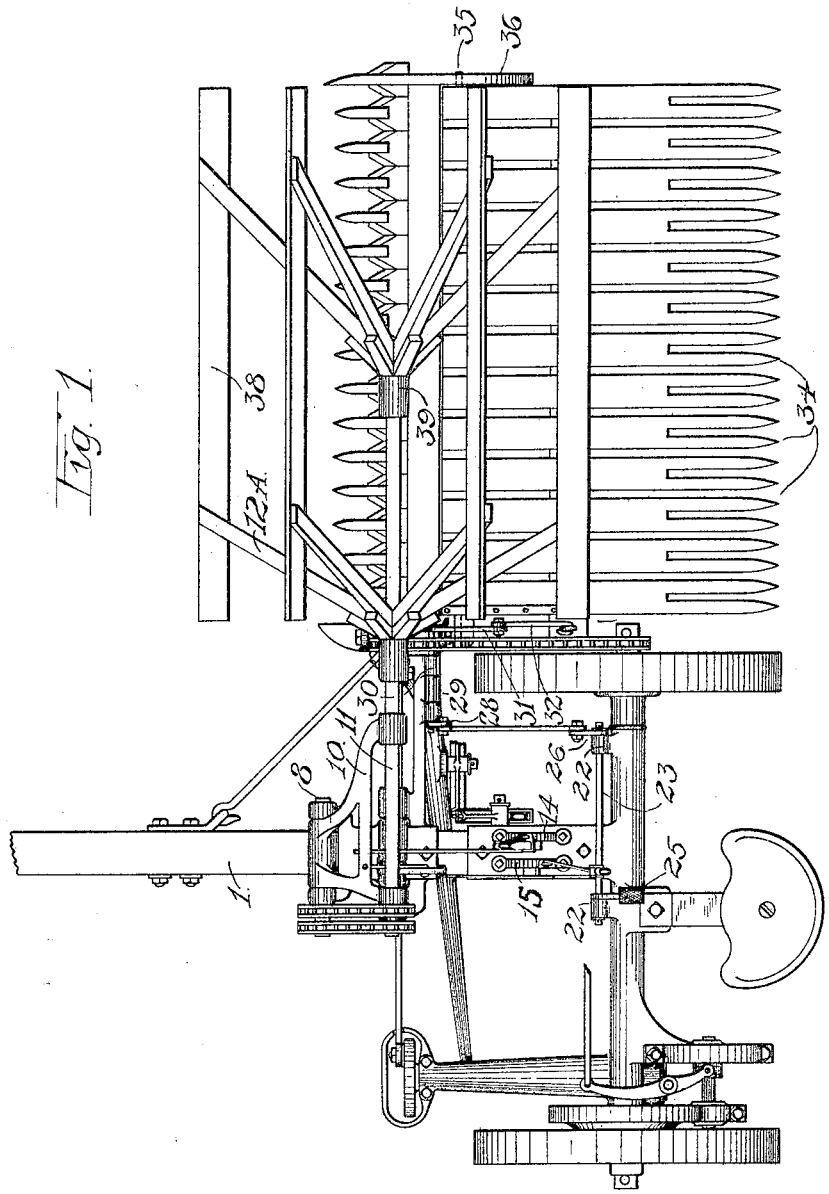
Figure 2:
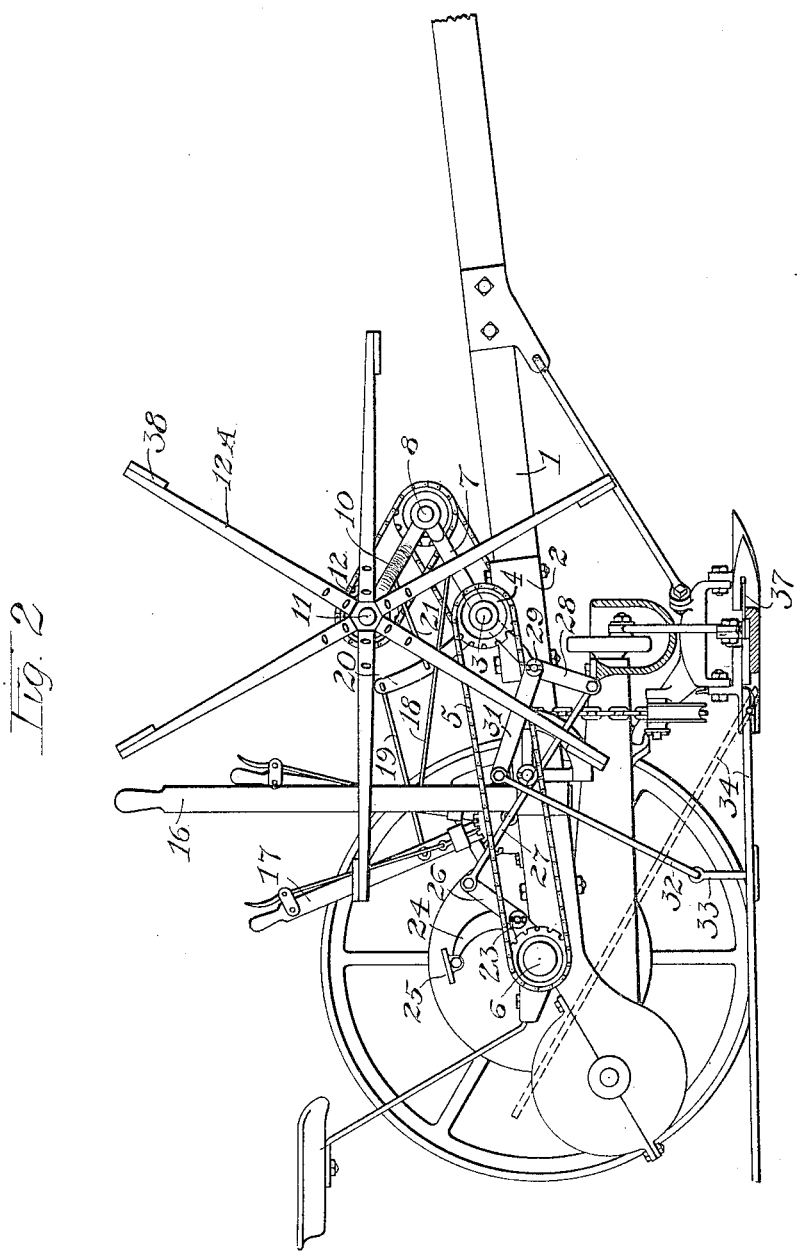
Figure 3:
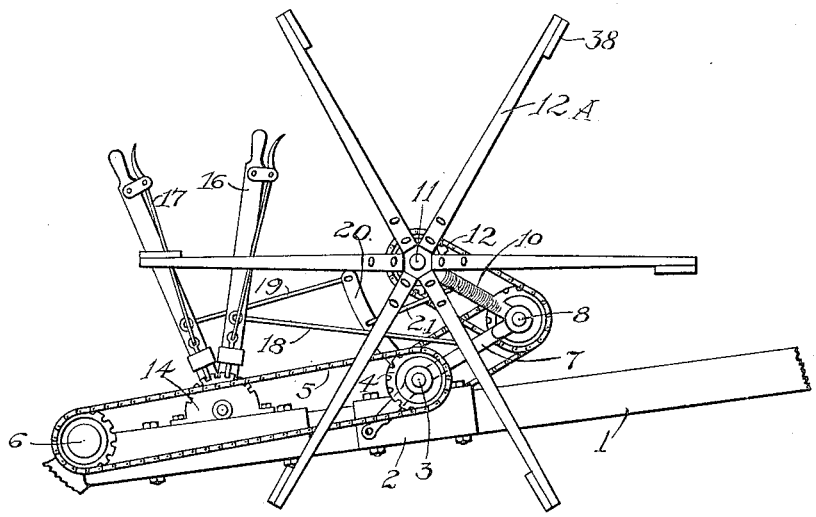
Figure 4:
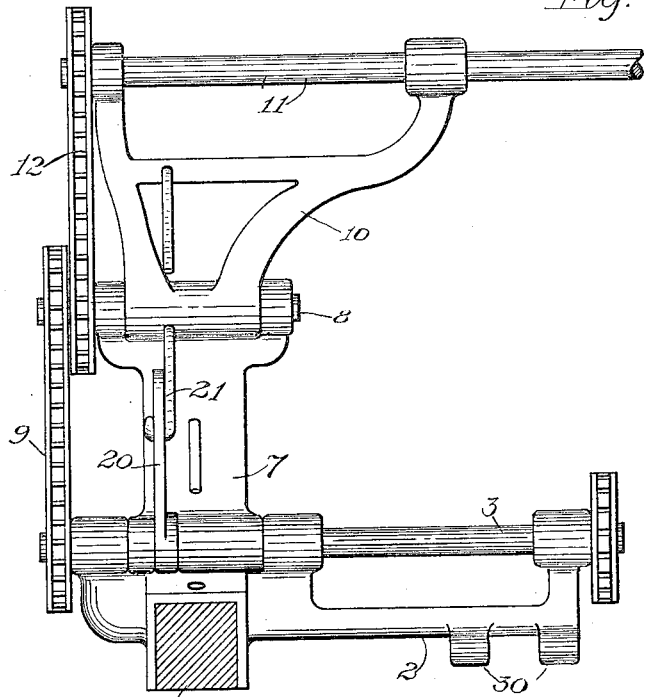

Figure 1 is a plan of my attachment upon a mower. Fig. 2 is a side elevation partly in section. Fig. 3 is a side elevation showing the reel and mechanism for adjusting the same. Fig. 4 is a detail of the reel adjusting mechanism. Fig. 5 is a detail of the buncher lifting levers. Fig. 6 is a rear elevation of Fig. 5. Figs. 7, 8 and 9 are details of the different castings that carry the arms that support the different size reels.

Like reference characters indicate corresponding parts throughout the several views.

1 is the tongue of the mower to which is secured a casting 2 that carries a shaft 3 on which is carried a gear 4 over which a chain 5 runs that connects with a gear on the drive shaft 6 which is the axle of the mower. A casting 7 loose on the shaft 3 carries at one end a stub shaft 8 which is operatively connected by chain 9 with the shaft 3 and a casting 10 is loosely disposed upon the stub shaft and serves as a bearing for the reel shaft 11 which is operatively connected by chain 12 to stub shaft 8.

12ª is a reel mounted upon the reel shaft 11 adapted as it rotates for contact with the growing clover.

The reel 12ª is adjustable in the following manner: A casting 13 secured upon the tongue 1 is provided with two segments 14 and 15 over which levers 16 and 17 work respectively. The lever 16 is provided with a link 18 engaging the casting 7 and when this lever is moved toward the rear of the mower the reel and its connections will also be moved in approximately the same direction, the purpose of this adjustment being to bring said reel in contact with the growing clover more or less in advance of the reciprocating knives carried by the mower. The lever 17 is provided with a link 19 connected to a bar 20 which at its opposite end engages the shaft 3 and which is also connected to a link 21 which engages the casting 10. When the lever 17 is moved toward the front of the mower the link 21 will, through the medium of casting 10, force the reel upward; the purpose of this adjustment being to regulate the reel for contact with clover of various heights.

In bearings 22, 22 carried by the axle of the mower a shaft 23 is mounted which shaft is provided with a link 24 for oscillating the same through the medium of a foot lever 25 carried by said link. Another link 26 made fast to shaft 23 is secured to an arm 27 that engages an arm 28 which is made fast to a shaft 29 journaled in ears 30 secured to the casting 2 and an arm 31 made fast to shaft 29 engages a link 32 that carries an arm 33 fixed to one of the buncher bars 34 that are disposed upon a pivot 35 carried by the divider board 36. It is readily seen that pressure upon the foot lever 25 will raise the buncher bars to the position shown dotted in Fig. 5, in which position they are ready to receive the clover that is first encountered by the reel 12 and by it laid back upon the said buncher boards when it is immediately cut by the ordinary reciprocating knives 37 of the mower. It will be noticed that the buncher boards are spaced apart and when a full bunch of clover has been deposited upon said boards while in their raised position pressure upon the foot lever may be withdrawn when the weight of the buncher bars will cause them to assume their normal or horizontal position a slight elevation above the ground. Some of the coarse portions of the clover will protrude through the spaces between the buncher bars and this coming in contact with the ground stubble will produce sufficient friction to remove the entire load of clover from the buncher bars and deposit it upon the ground.

The slats 38 of the reel are supported by the arms 12ª which are carried by castings 39 secured upon the reel shaft 11. It will be noticed that the branched end of the castings 39 in Figs. 7, 8 and 9 is inclined at different angles to the body of the casting. This is to accommodate reels of various lengths as partly illustrated in Fig. 1. The length of a reel slat must necessarily be equal to the combined width of all the buncher boards and to support said slats by arms 12ª without greatly lengthening the reel shaft, castings of the type illustrated in Fig. 8 may be employed.

What is claimed is:—

The combination with the tongue of a mowing machine, of a casting, a rotary shaft carried by said casting, a sectional adjustable support carried by said rotary shaft, a reel shaft carried by said sectional adjustable support, a bar connected to said rotary shaft, connection between said bar and said sectional adjustable support, manually operable means connected to said bar and carried by said tongue for raising and lowering said adjustable support with relation to the mowing machine, a lever carried by said tongue and connection between said tongue and sectional adjustable support whereby the latter may be moved forward or rearward with respect to the mowing machine.

In testimony that I claim the foregoing as my own I have hereto affixed my signature in the presence of two subscribing witnesses.

DANEL A. LINDHOLM.

Witnesses:
 VENER BLOOMQUIST,
 MAGNUS JAHNSAN.

Copies of this patent may be obtained for five cents each, by addressing the "Commissioner of Patents, Washington, D. C."